(12) United States Patent
Laskowski et al.

(10) Patent No.: US 11,050,651 B2
(45) Date of Patent: Jun. 29, 2021

(54) SYSTEMS AND METHODS FOR HEALTH MONITORING AND UPGRADE OF A DISTRIBUTED CONTROLLER

(71) Applicant: General Electric Company, Schenectady, NY (US)

(72) Inventors: Benjamin David Laskowski, Greenville, SC (US); John Raffensperger, Greenville, SC (US); Timothy Lee Janssen, Schenectady, NY (US); William Forrester Seely, Greenville, SC (US); Christopher Long, Greenville, SC (US); Karl Dean Minto, Greenville, SC (US)

(73) Assignee: General Electric Company, Schenectady, NY (US)

( * ) Notice: Subject to any disclaimer, the term of this patent is extended or adjusted under 35 U.S.C. 154(b) by 99 days.

(21) Appl. No.: 15/862,258

(22) Filed: Jan. 4, 2018

(65) Prior Publication Data
US 2019/0207840 A1     Jul. 4, 2019

(51) Int. Cl.
*H04L 12/26*       (2006.01)
*H04L 12/24*       (2006.01)
(Continued)

(52) U.S. Cl.
CPC .......... *H04L 43/10* (2013.01); *G05B 19/0428* (2013.01); *H04L 12/28* (2013.01);
(Continued)

(58) Field of Classification Search
CPC ............ G05B 19/0428; G05B 23/0291; G06F 11/302; H04L 12/28; H04L 41/044;
(Continued)

(56) References Cited

U.S. PATENT DOCUMENTS 7,032,029 B1 * 4/2006 Tanzman ................. G05B 9/03
                                                              700/82
2003/0188229 A1    10/2003   Lubbers et al.
(Continued)

FOREIGN PATENT DOCUMENTS

EP         2 610 487 A1     7/2013
WO     2012156775 A1    11/2012
(Continued)

OTHER PUBLICATIONS

Extended Search Report of EP 18215756.0, dated Jun. 4, 2019 (10 pp.).

*Primary Examiner* — Thomas J Dailey
(74) *Attorney, Agent, or Firm* — Eversheds Sutherland (US) LLP

(57) ABSTRACT

Systems and methods for health monitoring and upgrade of a distributed controller are provided. According to one embodiment of the disclosure, a method for health monitoring and upgrade of a distributed controller may commence with receiving, by a lower level controller from a high-level controller, high-level control references. The method may further include generating low-level control references for a hardware asset based at least in part on the high-level control references. The method may include monitoring the network connection and detecting an error in the network connection. In response to the detection of the error in the network connection, a control of the hardware asset may be transferred to the low-level controller. The method may further include determining that the network connection has been restored. In response to the determination that the network connection has been restored, the control of the hardware asset may be transferred to the high-level controller.

18 Claims, 7 Drawing Sheets

(51) Int. Cl.
*H04L 12/28* (2006.01)
*G05B 19/042* (2006.01)
*G06F 11/30* (2006.01)
*H04L 12/40* (2006.01)
*G05B 23/02* (2006.01)

(52) U.S. Cl.
CPC ........ *H04L 41/0654* (2013.01); *H04L 41/082* (2013.01); *H04L 43/0811* (2013.01); *G05B 23/0291* (2013.01); *G06F 11/302* (2013.01); *H04L 41/044* (2013.01); *H04L 41/0896* (2013.01); *H04L 43/0823* (2013.01); *H04L 2012/4026* (2013.01); *Y04S 40/00* (2013.01)

(58) Field of Classification Search
CPC .............. H04L 41/0654; H04L 41/082; H04L 41/0896; H04L 43/0811; H04L 43/0823; H04L 43/10; H04L 2012/4026; Y04S 40/00
See application file for complete search history.

(56) References Cited

U.S. PATENT DOCUMENTS

| | | | |
|---|---|---|---|
| 2005/0007964 A1* | 1/2005 | Falco | H04L 67/1089 370/256 |
| 2008/0104430 A1* | 5/2008 | Malone | G06F 1/3203 713/300 |
| 2009/0122699 A1 | 5/2009 | Alperovitch et al. | |
| 2012/0047509 A1* | 2/2012 | Ben-Itzhak | G06F 9/50 718/103 |
| 2012/0117416 A1 | 5/2012 | McLaughlin | |
| 2013/0035772 A1* | 2/2013 | Pearson | G05B 9/03 700/20 |
| 2013/0345829 A1* | 12/2013 | Garg | G05B 19/0428 700/9 |
| 2016/0036626 A1* | 2/2016 | Bale | H04L 41/0677 370/242 |
| 2017/0142623 A1* | 5/2017 | Lindoff | H04W 76/19 |

FOREIGN PATENT DOCUMENTS

| | | |
|---|---|---|
| WO | 2015198256 A2 | 12/2015 |
| WO | 2016184526 A1 | 11/2016 |

* cited by examiner

SYSTEMS AND METHODS FOR HEALTH MONITORING AND UPGRADE OF A DISTRIBUTED CONTROLLER

TECHNICAL FIELD

The disclosure relates to maintenance of hardware assets and, more specifically, to systems and methods for health monitoring and upgrade of a distributed controller.

BACKGROUND

Installation and upgrade of a control system typically require interrupting normal operations of the hardware assets being controlled. Such interruptions can be costly, especially when the hardware assets include heavy duty power generation units. Therefore, even though upgrades could result in increased efficiencies of the hardware assets, customers may opt to delay the upgrades or choose not to upgrade at all because they cannot afford to take the hardware assets offline.

Conventional solutions for upgrading a control system distribute control of hardware assets across multiple identical controllers for redundancy's sake with each controller containing the entirety of the controls. For example, an offline control system can be upgraded while the redundant system is operational. When the upgrade is complete, the control can be gracefully transferred (on the fly) to the upgraded system. This technique entails preserving state information for each component of the hardware asset while switching from one control to another.

However, the state information may change unpredictably during the upgrade resulting in tripping or even causing a significant change to the hardware asset. Over time, customers can lose trust in such upgrade processes and discontinue their use altogether. The conventional techniques appear to be inadequate due to the requirement of upgrading low level components directly responsible for controlling operations of hardware actuators of a hardware asset while the hardware asset is operational.

Furthermore, systems with distributed control may suffer from stability, safety, and reliability issues. While distributing responsibility may improve the flexibility of the system, it may also result in increased vulnerabilities to failures that are outside of its control. For example, systems with distributed control may suffer from unbalanced allocation of resources. Low-priority tasks may be consuming excessive amounts of central processing unit (CPU) time and preempting higher-priority tasks or consuming too much of network bandwidth. Moreover, low-priority messages can interfere with high-priority messages. In industrial control systems, all tasks are frequently given identical access to CPU, memory, and storage resources. In many applications this is appropriate, since the typical industrial control code lacks sophisticated algorithms that may require multiple time steps to execute. However, newer industrial control and monitoring platforms create scenarios in which finite computational resources can be shared by multiple applications that are of varying levels of importance to the overall system. For example, a task that provides real-time or near-real-time control of a gas turbine's main effectors may be given the same priority as a task that accumulates information about operation of the plant or computes degradation curves with timescales of hours or days. Currently, there is no prioritizing mechanism for different tasks.

Even though various controls can be built into many operating systems to set process priority, CPU affinity, and the like, these controls may depend quite heavily on the operating system and overall platform and may not be very portable. Some conventional systems may use separate hardware for real-time (higher-priority) and non-real-time (lower priority) functions, which is inconvenient and impractical.

BRIEF SUMMARY OF THE DISCLOSURE

This disclosure relates to systems and methods for industrial network monitoring. Certain embodiments of the disclosure can provide procedures for monitoring and diagnostics of electrical equipment of a plant based on analysis of a data network. Some embodiments of the disclosure may facilitate early predictions of failures of electrical and mechanical plant equipment.

According to one embodiment of the disclosure, a system for health monitoring and upgrade of a distributed controller is provided. The system may include a high-level controller, a low-level controller, and a health monitoring module. The low-level controller may be in communication with the high-level controller via a network through a network connection. The low-level controller may be configured to receive high-level control references from the high-level controller via the network connection. The low-level controller may be further configured to generate low-level control references for a hardware asset based at least in part on the high-level control references. The low-level controller may be further configured to facilitate control of the hardware asset in response to an error in the network connection. The health monitoring module may be configured to monitor the network connection and detect the error in the network connection. In response to the detection of the error in the network connection, the health monitoring module may transfer a control of the hardware asset to the low-level controller. The health monitoring module may be configured to determine that the network connection has been restored. In response to the determination that the network connection has been restored, the health monitoring module may transfer the control of the hardware asset to the high-level controller.

According to another embodiment of the disclosure, a method for health monitoring and upgrade of a distributed controller is provided. The method may commence with receiving, via a network connection, by a lower level controller from a high-level controller, high-level control references. The method may further include generating, by the low-level controller, low-level control references for a hardware asset based at least in part on the high-level control references. The method may include monitoring, by a health monitoring module, the network connection. The method may continue with detecting, by the health monitoring module, an error in the network connection. In response to the detection of the error in the network connection, a control of the hardware asset may be transferred to the low-level controller. The method may further include determining, by the health monitoring module, that the network connection has been restored. In response to the determination that the network connection has been restored, the control of the hardware asset may be transferred to the high-level controller.

Other embodiments, systems, methods, features, and aspects will become apparent from the following description taken in conjunction with the following drawings.

DETAILED DESCRIPTION

Figure 1:
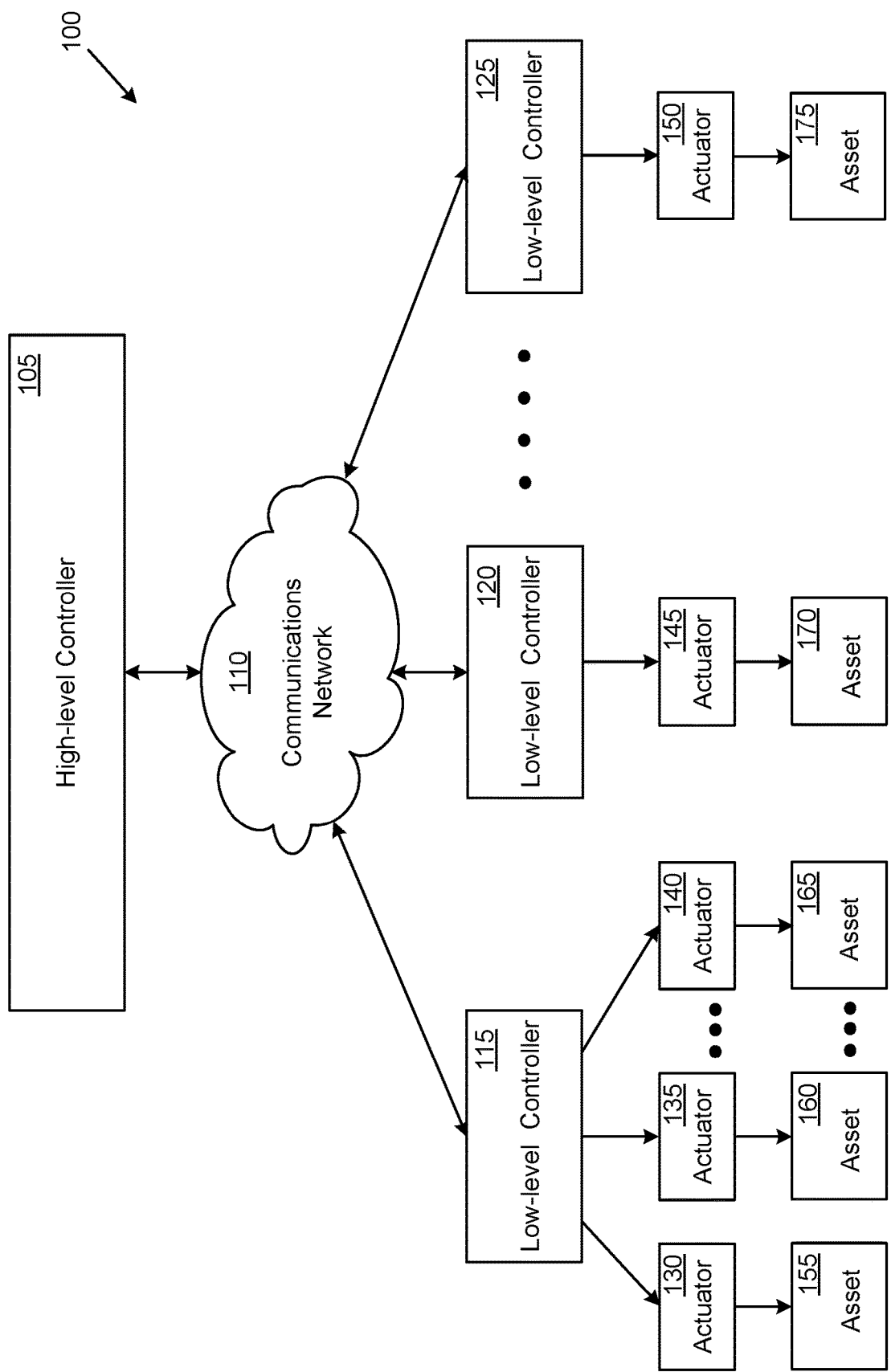
FIG. 1 illustrates a system that provides for non-homogeneous control of a plurality of assets, according to certain example embodiments of the disclosure.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the disclosure can include systems and methods for online installation and upgrade of a distributed control system without interrupting the asset under control from normal operation. The distributed control system can include a high-level controller and a low-level controller in communication with the high-level controller through a network connection. The high-level controller can be responsible for generating high-level control references for the low-level controller and overall operations of the distributed control system. The low-level controller can be responsible for direct control of actuators of a hardware asset based on the received high-level control references.

Furthermore, the low-level controller can assume control of the hardware asset without having to rely on the high-level control references in response to a loss of connection between the high-level controller and the low-level controller. The loss of connection can occur due to a malfunction or be forced by operators of the distributed control system in order to perform installation of new software or perform periodic upgrades of the existing software on the high-level controller.

Once the network connection is restored, the control of the hardware asset can be gracefully transferred back to the high-level controller. For example, each subsystem of the high-level controller can be brought back online, one at a time, by turning off the corresponding network-failed status. In some example embodiments, while transferring control back to the high-level controller, critical and protective functions can be performed first, followed by multi-system coordinated functions, and finally stand-alone and ancillary systems. Performing a reliable software upgrade or installation without an outage of the hardware asset can provide considerable commercial advantage.

Certain embodiments of the disclosure can include health monitoring and recovery of the distributed control system. In order to monitor the system's health, a heartbeat (periodic signal communication) can be established between components of a distributed platform. A lack of the heartbeat can be indicative of a loss of communications between the components of the distributed platform. Upon loss of the heartbeat, the distributed control system can switch to a fail-degraded mode. Different detection methods for determining connection quality and loss can be used.

In some example embodiments of the disclosure, the health monitoring and recovery can include a detection of a loss of a connection to the high-level controller, transferring control to the low-level controller, and re-establishment of the control by the high-level controller once the connection is restored. Systems and methods for health monitoring and recovery of the distributed control system can be utilized when a channel of communications is opened between the low-level controller and the high-level controller. For example, a counter can be communicated back and forth between the low-level controller and the high-level controller on every cycle. When the counter is not seen as having incremented by either side, the connection is deemed lost and the recovery mode is activated. This can mean that the heartbeat module would immediately send a signal to the critical logic in control to switch to a fail-safe mode of operation that does not rely on any updates from the high-level controller.

In some example embodiments, upon a loss of communications with the upper-level controller, the low-level controller can maintain a hold-steady state or, if it is safety critical, ignore the current state and switch to a self-contained control loop that may not be optimal but is stable and operational. The heartbeat module may actively listen for the connection to be resumed (counter to be incremented). In case of a forced outage and software installation/upgrade, once the physical connection is restored, the updated upper-level controller can take control.

Thus, the heartbeat module associated with the low-level controller can then determine the quality of the connection (time between heartbeats, number of frames skipped, and so forth) and, if it is deemed acceptable, signal to the core control logic to switch out of its fail-safe mode and resume normal execution that utilizes the upper-level controller.

The health monitoring and recovery can improve stability, safety, and reliability of distributed platforms. Distributing responsibility can provide the system with more flexibility but may also make it more vulnerable to failures that are outside of its control. The health monitoring and recovery detailed herein provides a software solution that accounts for these additional failure modes and handles them gracefully.

Certain embodiments of the disclosure can include methods and systems for prioritizing applications and communications. CPU time and network bandwidth can be shared among multiple applications running on the same physical hardware based on priorities of the applications. Some applications, such as, for example, critical control loops, may require pseudo-real-time execution. Other applications, such as, for example, advisory or monitoring applications, may only need to run when CPU time is available. Similarly, the total network communication bandwidth available to a suite of applications may be allocated based on relative priority of the applications, with more priority and/or bandwidth assigned to those functions that require more timely responses.

Implementing an execution time limitation mechanism can provide a platform-independent way to balance tasks with near-real-time priority with other lower-priority but longer-running tasks. Incorporating such a scheduling mechanism can allow the resulting application to be run on many platforms with little (if any) additional development effort. CPU usage of long-running but low-priority background processes can be limited.

In some example embodiments, a method for prioritizing applications and communications can define a maximum execution duration from each time slice that low-priority functions are permitted to consume. For example, if each main function for the overall application is called every x seconds, then the low-priority tasks are permitted to occupy no more than y seconds, where y<x. For moderate loading of the host system, this can provide a manner to guarantee that low-priority applications do not consume excessive amounts of CPU time or preempt higher-priority tasks.

According to an example embodiment, a similar approach may be taken to limit network bandwidth consumption. Each large (or low-priority) method may be split into multiple smaller segments for transmission during times of low network load. Alternatively, a maximum bandwidth for low-priority messages can be set, and these low-priority messages buffered until a slot is available to transmit them. Another example method can divide, for example, a Predix™ Machine-based set of OPC-UA variables across two or more communications adapters; one is designated for high priority messages, and the other is designated for low-priority messages. Separation of the messages this way can increase the likelihood of low-priority messages not interacting with high-priority messages.

Technical effects of certain embodiments of the disclosure may include distributing control of a hardware asset to allow installation or upgrade of a control system without interrupting an asset being controlled by the control system from normal operation. Further technical effects of certain embodiments of the disclosure may include creating safe and stable multi-level control systems for hardware assets by providing reliable and safe detection and recovery of connection losses between a low-level controller and a high-level controller. Yet further technical effects of certain embodiments of the disclosure may include prioritizing applications and communications in a distributed control system.

The following provides a detailed description of various example embodiments related to systems and methods of health monitoring and upgrade of a distributed controller.

Attention is now drawn to FIG. 1, which illustrates an example system 100 that provides for non-homogeneous control of a plurality of assets in accordance with an example embodiment of the disclosure. The example system 100 can include a high-level controller 105 that is communicatively coupled to one or more low-level controllers, such as a first low-level controller 115, a second low-level controller 120, and an "$n^{th}$" low-level controller 125 (n>1). In another implementation, the high-level controller 105 can be communicatively coupled to a single low-level controller. Each of the low-level controllers can be coupled to one or more actuators that actuate one or more controls (such as a temperature control, a fuel-feed control etc.) of an associated physical asset. In one example implementation, each of a first physical asset 155, a second physical asset 160, and an "$n^{th}$," physical asset 175 (n>1) is a power generation unit.

The description hereon refers to the first low-level controller 115 and the asset 155 but it should be understood that the description applies equally well to the other low-level controllers and assets. Furthermore, the asset 155 may be referred to in some instances as a power generation unit, which is one example of an asset that can be operated upon in accordance with various example embodiments of the disclosure.

The communications network 110 used to provide the communicative coupling between the high-level controller 105 and the one or more low-level controllers can be any one or more of various types of communications networks such as the Internet, a private wide-area network (WAN), or a private local area network (LAN).

In accordance with the example embodiment shown in FIG. 1, the high-level controller 105 can be a server computer configured to operate with relatively complex software programs written in a high-level programming language. One example of a relatively complex software program can be a data mining program that is used to process a large quantity of raw data (such as temperature data and/or steam pressure data obtained from one or more power generation units) into useful information (such as for use in mean time between failures calculations, for determining a servicing schedule, or for scheduling a repair ahead of a failure etc.). The high-level controller 105 may include the latest hardware and may allow the software to be changed or updated on a frequent basis (every year, for example). Consequently, the high-level controller 105 may be taken offline or shut down for various reasons such as for upgrades, repairs, or reconfiguration.

On the other hand, the low-level controller 115 can be a computer containing robust and simple hardware configured to operate with relatively simple software programs. In some cases, the simple software programs may be written in a low-level programming language or in firmware. The hardware and software in the low-level controller 115 may be selected on the basis of ensuring that the low-level controller 115 offers a high mean time between failures (MTBF) and controls the asset 155 in a manner that permits the asset 155 to have a high MTBF as well. One example of a relatively simple software program is a control program that provides one or control signals to a cooling system for injecting water to cool an overheated portion of a power generation unit. The low-level controller 115 may include hardware which is highly reliable but may be outdated in some cases. The software may also be outdated. Both the hardware and the software may be selected to prevent the low-level controller 115 from being taken offline or shut down other than in extraordinary circumstances (such as a hardware failure or a natural disaster) so as to avoid interruption in distributing power to customers.

Figure 2:
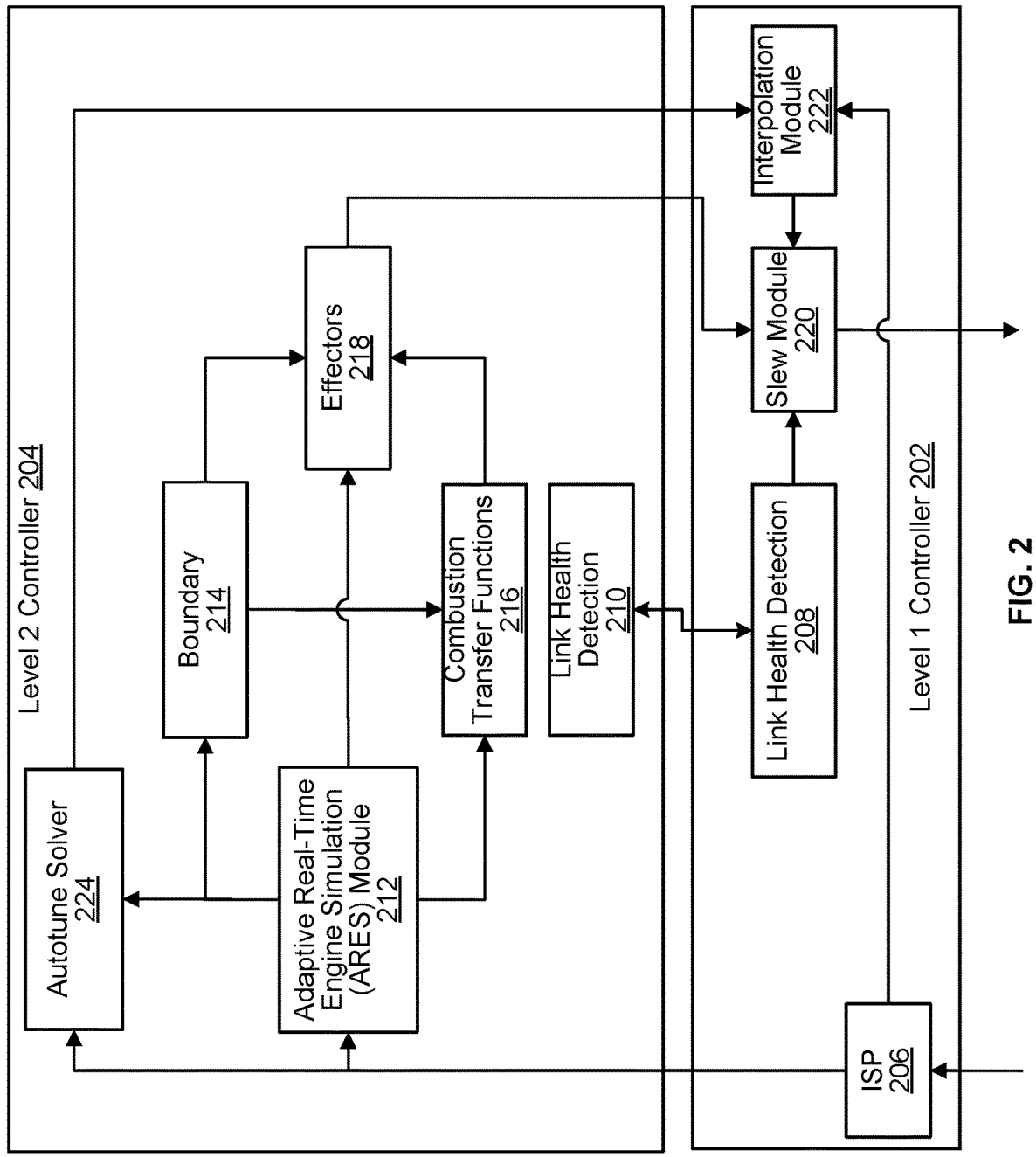
FIG. 2 is a block diagram showing a split of control between two controllers to provide a multilevel control of an asset, according to certain example embodiments of the disclosure.

FIG. 2 is a block diagram illustrating a split of control between a level 1 controller 202 and level 2 controller 204 to provide a multilevel control of an asset. The level 2 controller 204 may be also referred to as a high-level controller and may perform a supervisory control of an asset (for example, a power generating asset). The level 1 controller 202 may also be referred to as a low-level controller and may perform a physical control of the asset. Different application software may be executed on each of the level 1 controller 202 and the level 2 controller 204, which may or may not have overlap in functionality or a programming code between the level 1 controller 202 and the level 2 controller 204.

The level 1 controller 202 and the level 2 controller 204 may be in a network communication with each other. A health of a link between the level 1 controller 202 and the level 2 controller 204 may be constantly monitored and detected, as shown by blocks 208 and 210. Specifically, a health monitoring module may be responsible for detecting a heartbeat between the level 1 controller 202 and the level 2 controller 204. In an example embodiment, the level 2 controller 204 may send a heartbeat signal every 2 seconds to the level 1 controller 202 to indicate the level 2 controller 204 is active. In case the health monitoring module does not detect, for example, three heartbeat signals in a row, the health monitoring module may determine that the connection with the level 2 controller is lost.

The level 1 controller 202 may perform a controlling function based on a presence or absence of the heartbeat. Specifically, the level 1 controller 202 may have a slew module 220 that may switch between an internal level 1 control when no connection is currently established between the level 1 controller 202 and the level 2 controller 204 and an external level 2 control when the connection is currently established between the level 1 controller 202 and the level 2 controller 204. The internal level 1 control may include controlling the asset based on parameters previously stored in a look up table by the level 2 controller 204. The external level 2 control may include controlling the asset based on parameters currently determined and provided by the level 2 204 controller to the level 1 controller 202.

The level 1 controller 202 may further have an interpolation module 222 that may have a capability to perform the interpolation of data provided by the level 2 controller 204.

In an example embodiment, the level 1 controller 202 may perform input signaling processing (ISP) 206 based on data received from sensors, analyzers, actuators, and other units associated with an operation of the asset. The results of the ISP 206 may be provided to an autotune solver and an adaptive real-time engine simulation (ARES) module 212 of the level 2 controller 204, and may be used by the interpolation module 222.

The ARES module 212 of the level 2 controller 204 may estimate certain operating parameters of the asset. For example, in one embodiment, the ARES module 212 estimates boundaries 214 of the operational parameters and combustion transfer functions 216. Based on the boundaries 214 and the combustion transfer functions 216, the ARES module 212 determines effectors 218 to affect the operation of the asset. The effectors 218 may include an input operational parameters adjustment, which may result in controlling of the boundaries 214.

The level 2 controller 204 may provide the effectors 218 to the level 1 controller 202, specifically, to the slew module 220. The level 2 controller 204 may use the effectors 218 to control the operation of the asset.

In conventional asset control systems, an online download of the software to controllers can be difficult to accomplish. For example, there may be two or three simultaneously operating controllers, all of which are low-level controllers. The software can be downloaded to one of the controllers, followed by downloading the software to the second one, and while the download is in progress, the third controller can be still in control. Once the download of the new software to the first and second controllers is complete, the control can be gracefully transferred to the first and second controller, and the software downloaded to the third controller.

During such online download of the software, state information needs to be moved over from one controller to another controller. The controller may no longer have the same state information because some code has changed, or been deleted or added. Therefore, the controller may have a tendency to trip the asset in case of a significant change of the state information and when changeover between the controllers cannot be handled without turning the asset off.

Figure 3:
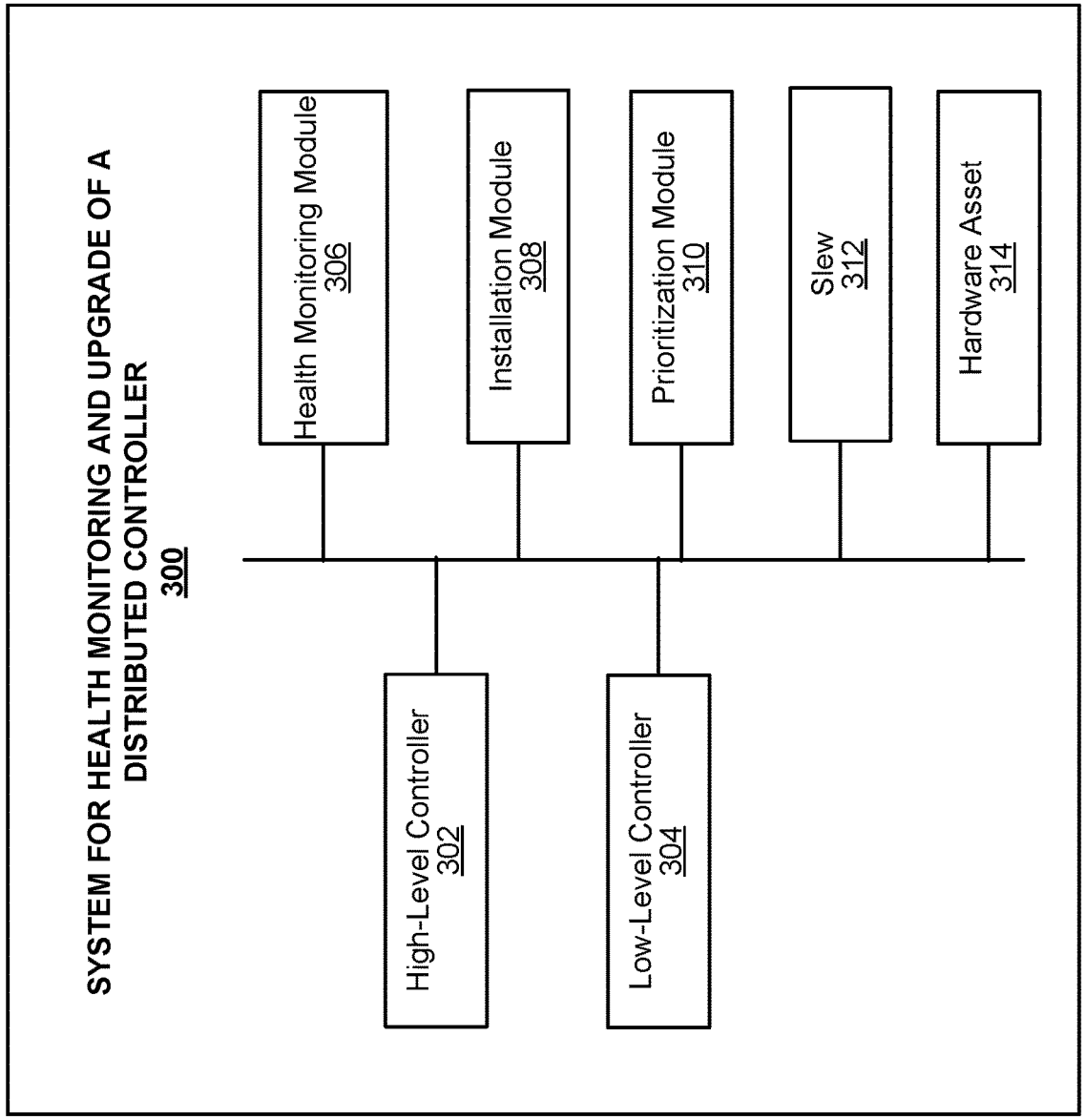
FIG. 3 is a flow chart illustrating an example system for health monitoring and upgrade of a distributed controller, according to certain example embodiments of the disclosure.
Figure 4:
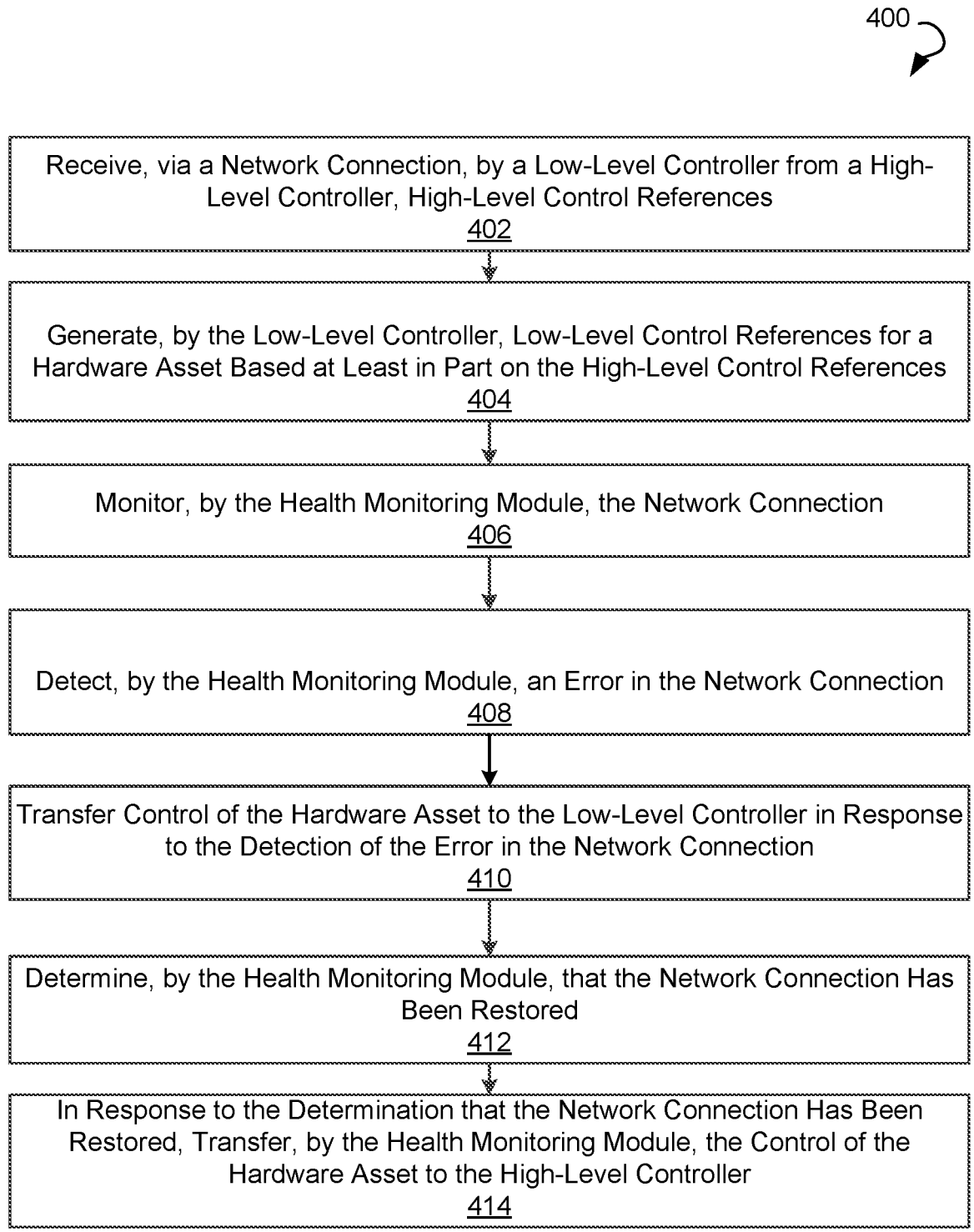
FIG. 4 is a flow chart illustrating an example method for health monitoring and upgrade of a distributed controller, according to certain example embodiments of the disclosure.
Figure 5:
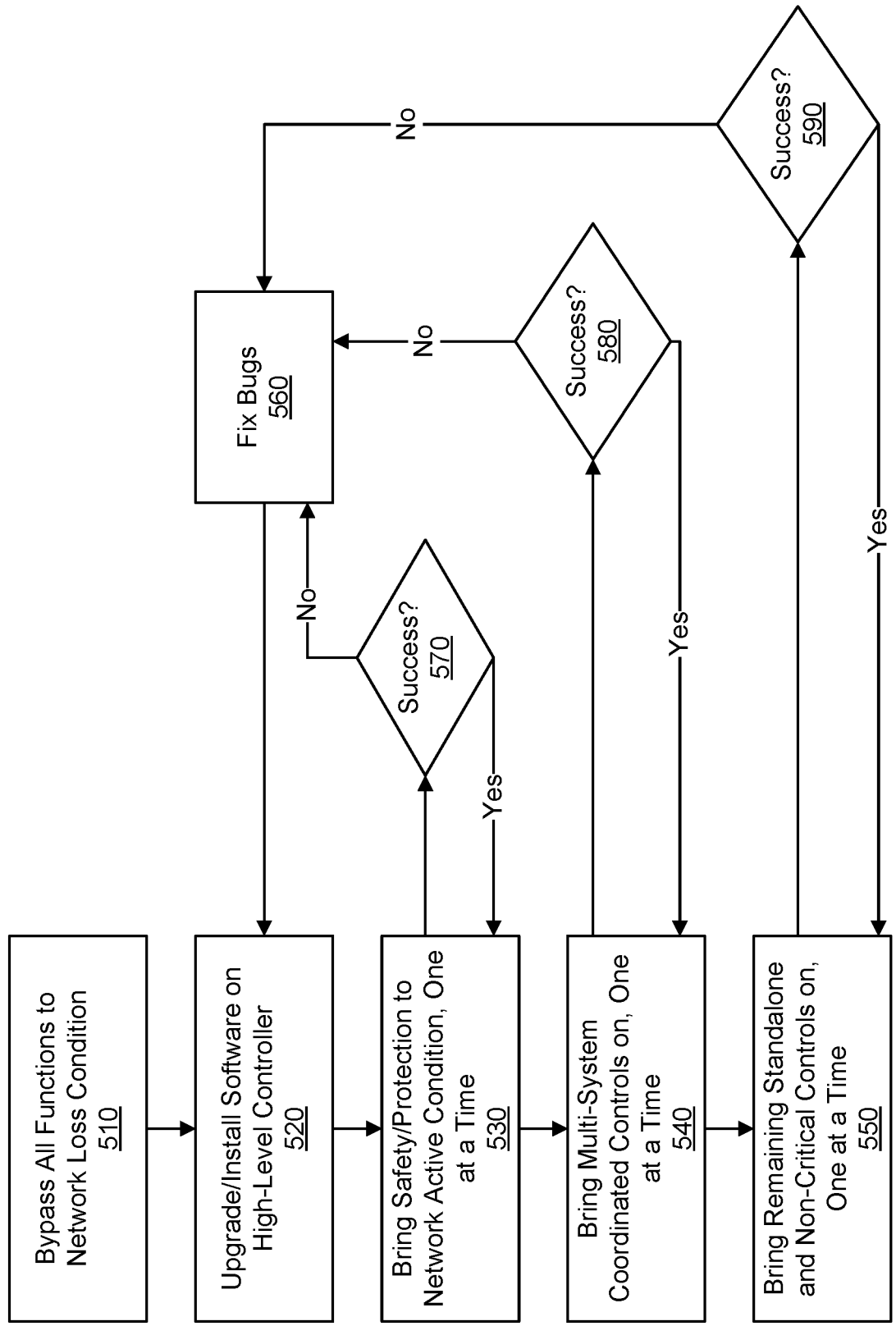
FIG. 5 is a flow diagram illustrating an installation or upgrade of a software to high-level controller without interrupting an asset under control from normal operation, in accordance with certain example embodiments of the disclosure.

FIGS. 3-5 below describe an asset control system that is separated into a high-level controller and a low-level controller so that the high-level controller can be disconnected from the low-level controller while software of the high-level controller is installed or upgraded, and the high-level controller may be brought back online. In the meantime, the control can be transferred to the low-level controller. The low-level controller may rarely (if ever) need any upgrades because the low-level controller operates just as an input/output (I/O) handler for the high-level controller.

FIG. 3 is a block diagram illustrating various example modules of a system 300 for health monitoring and upgrade of a distributed controller, in accordance with certain embodiments of the disclosure. The system 300 may include a high-level controller 302, a low-level controller 304, a health monitoring module 306, an installation module 308, a prioritization module 310, a slew 312, and a hardware asset 314. In an example embodiment, the hardware asset 314 is a power generating asset, such as a gas power plant, a steam power plant, a combined cycle power plant, and so forth.

The low-level controller 304 may be in communication with the high-level controller 302 via a network through a network connection. The low-level controller 304 may be configured to receive high-level control references from the high-level controller 302 via the network connection. Based at least in part on the high-level control references, the low-level controller 304 may generate low-level control references for the hardware asset 314.

The health monitoring module 306 may be configured to monitor the network connection and detect the error in the network connection. Specifically, the health monitoring module 306 may monitor the network connection by periodically sending at least one signal between the high-level controller 302 and the low-level controller 304. A lack of acknowledgment of receipt of the at least one signal may be indicative of the error in the network connection.

In response to the detection of the error in the network connection, the health monitoring module 306 may transfer a control of the hardware asset to the low-level controller 304. In an example embodiment, the health monitoring module 306 may be configured to transfer the control of the hardware asset 314 by gradually shifting the control between the low-level controller 304 and the high-level controller 302.

The low-level controller 304 may be configured to facilitate control of the hardware asset 314 in response to an error in the network connection. In an example embodiment, the low-level controller 304 may be configured to operate in a fail-safe self-contained loop mode during a loss of communications (i.e., when the low-level controller 304 is in control of the hardware asset 314). The low-level controller 304 may be configured to control the hardware asset by providing the low-level control references to sensors and actuators associated with the hardware asset 314.

In an example embodiment, the error in the network connection may be caused by the installation module 308. Specifically, the installation module 308 may be configured to interrupt communications in the network connection to temporarily transfer the control of the hardware asset 314 to the low-level controller 304. While the hardware asset 314 is under the control of the low-level controller 304, the installation module 308 may install software on the high-level controller 302. In an example embodiment, the software may include at least one of the following: new software, an upgrade, a bug fix, and so forth. The installation module 308 may be further configured to restore the network connection, thereby causing a transfer of the control of the hardware asset 314 back to the high-level controller 302.

The health monitoring module 306 may be further configured to determine that the network connection has been restored. In response to the determination that the network connection has been restored, the health monitoring module 306 may transfer the control of the hardware asset to the high-level controller 302.

The prioritization module 310 may be configured to prioritize one or more applications associated with the high-level controller 302 and the low-level controller 304 based on respective relative priorities of the one or more applications. Based on the prioritization of the one or more applications, the prioritization module 310 may allocate a CPU clock time among the one or more applications. Specifically, the prioritization module 310 may be configured to allocate the CPU clock time for the one or more applications by defining a maximum execution duration for each allocated unit based on the relative priorities of the one or more applications.

Moreover, the prioritization module 310 may be configured to prioritize one or more communications associated with the high-level controller 302 and the low-level controller 304 based at least in part on relative priorities of the one or more communications. The prioritization module 310 may further allocate a network bandwidth among the one or more communications based on the prioritization of the one or more communications. Specifically, the prioritization module 310 may be configured to allocate the network bandwidth for the one or more communications by defining a maximum bandwidth segment for each allocated unit based on the relative priorities of the one or more communications.

In a further example embodiment, the prioritization module 310 may be configured to prioritize safety systems and protection systems. The safety systems and protection systems may be associated with the hardware asset 314.

FIG. 4 depicts a process flow diagram illustrating an example method 400 for health monitoring and upgrade of a distributed controller, in accordance with an embodiment of the disclosure. The method 400 may be performed by processing logic that may comprise hardware (e.g., dedicated logic, programmable logic, and microcode), software (such as software run on a general-purpose computer system or a dedicated machine), or a combination of both.

As shown in FIG. 4, the method 400 may commence at operation 402 with receiving high-level control references by a lower level controller from a high-level controller. The high-level control references may be received by the lower level controller via a network connection established between the lower level controller and the high-level controller. At operation 404, the low-level controller may generate low-level control references for a hardware asset based at least in part on the high-level control references.

At operation 406, the network connection may be monitored by a health monitoring module. In an example embodiment, the monitoring of the network connection includes periodically sending, by the health monitoring module, at least one signal between the high-level controller and the low-level controller. A lack of acknowledgment of receipt of the at least one signal may be indicative of the error in the network connection. The method 400 may optionally include forcing an error in the network connection to temporarily transfer the control of the hardware asset to the low-level controller. The error may be caused by an installation module. The health monitoring module may detect an error in the network connection at operation 408.

In an example embodiment, a heartbeat technology can be applied to detect the error in the network connection. Specifically, a heartbeat signal may be sent between the high-level controller and the low-level controller. A counter may be communicated back and forth on every cycle of sending the heartbeat signal. When the counter is not seen as having incremented by either of the high-level controller and the low-level controller, the network connection may be deemed lost and a recovery mode may be activated by the health monitoring module. The recovery mode includes immediately sending a heartbeat signal to the low-level controller to switch to a fail-safe self-contained loop mode of operation. When operating in the fail-safe self-contained loop mode, the low-level controller may not rely on any updates from the high-level controller. In an example embodiment, the fail-safe self-contained loop mode may be a hold-steady state, or if the fail-safe self-contained loop mode is safety critical, the low-level controller may ignore its current state and switch to the fail-safe self-contained loop mode that may be not optimal but is stable and operational.

Meanwhile, the health monitoring module may be continuously actively listening for the connection to be resumed (e.g., for the counter to be incremented). The health monitoring module is continuously listening because the high-level controller never stops trying to send an update to the low-level controller. Once the network connection between the high-level controller and the low-level controller is restored, the update sent by the high-level controller to the low-level controller can be seen by the health monitoring module. The health monitoring module can then determine the quality of the network connection (e.g., based on time between heartbeat signals, number of frames skipped, etc.) and, if the network connection is deemed acceptable, the health monitoring module may signal to the low-level controller to switch out of the fail-safe self-contained loop mode and resume normal execution that requires the operation of the high-level controller.

The detection of the error in the network connection may trigger the control of the hardware asset to the low-level controller. Specifically, in response to the detection of the error in the network connection, the health monitoring module may transfer a control of the hardware asset to the low-level controller at operation 410. In an example embodiment, the transferring of the control of the hardware asset includes gradually shifting the control between the low-level controller and the high-level controller. The low-level controller may operate in a fail-safe self-contained loop mode during a loss of communications. In an example embodiment, the low-level controller may control the hardware asset by providing the low-level control references to sensors and actuators associated with the hardware asset.

The method 400 may further optionally include installing, by the installation module, software on the high-level controller while the low-level controller is in control of the hardware asset. In an example embodiment, the software may include at least one of the following: new software, an upgrade, a bug fix, and so forth. The method 400 may further optionally include restoring the network connection. The network connection may be restored by the installation module when the installation of the software is completed. By restoring the network connection, the installation module may cause a transfer of the control of the hardware asset back to the high-level controller. Specifically, the method may include operation 412, at which the health monitoring module may determine that the network connection has been restored. In response to the determination that the network connection has been restored, the health monitoring module may transfer the control of the hardware asset to the high-level controller at operation 414.

In industrial control systems, all tasks are frequently given identical access to CPU, memory, and storage resources. However, some industrial control and monitoring platforms create a scenario in which finite computational resource can be shared by multiple applications that are of varying levels of importance to the high-level controller. For example, a task that provides real-time or near-real-time control of main effectors of an operation of a plant need to run with a higher priority than a task that accumulates information about operation of the plant or computes degradation curves with timescales of hours or days.

To provide a priority mechanism for different types of applications, the method 400 may further optionally include prioritizing, by a prioritization module, one or more applications associated with the high-level controller and the low-level controller based on relative priorities of the one or more applications. Specifically, the applications may run with different priorities on the high-level controller. Some applications, like critical control loops, may require pseudo-real-time execution. Other applications, like advisory or monitoring applications, may only need to run in whatever CPU time is available. Similarly, the total network bandwidth available to a plurality of applications may be allocated based on relative priority of the applications, with more priority and/or network bandwidth assigned to those functions that require more timely responses.

Therefore, the prioritization module may allocate a CPU clock time among the one or more applications based on the prioritization of the one or more applications. In an example embodiment, the prioritizing of the one or more applications may include allocating the CPU clock time for the one or more applications by defining a maximum execution duration for each allocated unit based on the relative priorities of the one or more applications. Specifically, the prioritizing may also include defining the maximum execution duration that each of a high-priority unit and a low-priority unit are permitted to consume. For example, if each high-priority task for the application is called every x seconds, then the low-priority tasks are permitted to occupy no more than y seconds, where y<x. For moderate loading of the high-level controller, this provides a means to guarantee that low-priority tasks do not consume excessive amounts of CPU time or preempt high-priority tasks.

Notably, implementing an execution time limitation mechanism provides a platform-independent way to balance tasks with near-real-time priority with other lower-priority but longer-running tasks. Incorporating such an execution time limitation mechanism as a scheduling mechanism into Java code, for example, allows the application to run on many platforms with little (if any) additional development effort.

Optionally, the method 400 may include prioritizing, by the prioritization module, one or more communications associated with the high-level controller and the low-level controller based on relative priorities of the one or more communications. The prioritization module may allocate a network bandwidth among the one or more communications based on the prioritization of the one or more communications. In an example embodiment, the prioritizing of the one or more applications may include allocating the network bandwidth for the one or more communications by defining a maximum bandwidth segment for each allocated unit based on the relative priorities of the one or more communications.

Specifically, each large (or low-priority) task may be split into multiple smaller segments for transmission during times of low network load. Alternatively, a maximum bandwidth for low-priority communications may be set, and these low-priority communications may be buffered until a slot is available to transmit the communications. In another example embodiment, OPC-UA, which is used for creating standards and network communication model for sending data across the network, may be used. Specifically, for example, a Predix™ Machine-based set of OPC-UA variables are divided across two or more communications adapters, where one adapter is designated for high priority communications, and the other is designated for low-priority communications. Separation of the communications in such a way prevents interaction of the low-priority communications with the high-priority communications.

Optionally, the method 400 may include prioritizing safety systems and protection systems by the prioritization module.

In an example embodiment of performing the prioritization, a Predix™ Machine application can serve as a high-level controller. This application can have two main functions: one function includes performing near-real-time control of a gas turbine and a second function includes computing backup control curves for transmission to the low-level controller. The backup curve calculation is relatively computationally intensive. The backup curve calculation has to be completed, but the timing constraints are much more relaxed than those imposed upon the near-real-time control function. To limit the impact on the high-level controller, a maximum execution time for each of the functions is imposed to a solver loop. A timer running in the background is compared to the maximum execution time after each execution of the solver loop, and when the limit is reached, the solver function is suspended until the next call to the high-level controller. The application is called about every 2.5 seconds, and the low-priority portion of the task is set to run for no more than about 0.1 second. On sufficiently fast or powerful hardware, this may provide the result that average CPU usage may be quite low, and the background calculation still completes in a reasonable amount of time.

FIG. 5 shows a flow diagram illustrating an installation or upgrade of a software to a high-level controller without interrupting an asset under control from normal operation, according to an example embodiment. At block 510, all functions may be bypassed to a network loss condition. Specifically, communications in the network connection between a high-level controller and a low-level controller may be interrupted and the lower level controller may be forced into a 'network failed' condition so as to temporarily transfer the control of a hardware asset to the low-level controller. At block 520, while the low-level controller is in control of the hardware asset, software may be installed and/or upgraded on the high-level controller.

At block 530, all safety/critical/protection subsystems may be brought to a network active condition. Specifically, the network connection may be restored, thereby causing a transfer of the control of the hardware asset back to the high-level controller. The transferring of the control may be gradual by transferring the control of safety/critical/protection subsystems one at a time. If the transfer of one of the safety/critical/protection subsystem controls is successful, the transfer of other safety/protection controls is performed, as shown by block 570. If the transfer is unsuccessful, the process goes to block 560 on which bugs are fixed, followed by returning to block 520.

When the transfer of all safety/critical/protection subsystem controls is successful, multi-system coordinated controls are brought on, one at a time, as shown in block 540. If the transfer of one of the multi-system coordinated controls is successful, the transfer of other multi-system coordinated controls is performed, as shown by block 580. If the transfer is unsuccessful, the process goes to block 560 on which bugs are fixed, followed by returning to block 520.

When the transfer of all multi-system coordinated controls is successful, remaining standalone and non-critical controls are brought on, one at a time, as shown in block 550. If the transfer of one of the standalone and non-critical controls is successful, the transfer of other standalone and non-critical controls is performed, as shown by block 590. If the transfer is unsuccessful, the process goes to block 560 on which bugs are fixed, followed by returning to block 520.

Therefore, safety, critical, and protective functions are transferred first, followed by the transfer of multi-system coordinated functions, and finally stand-alone and non-critical ancillary systems are transferred.

In an example embodiment, to perform the upgrade on the high-level controller, no reboot of the high-level controller is needed. In contrast, only those subsystems that are impacted by the upgrade are taken offline and transferred under the control of the low-level controller. The subsystems of the high-level controller are brought back online, i.e., under the control of the high-level controller, gradually, one at a time, in an order described above. If a reboot of the high-level controller is needed for the upgrade, it is treated to be an initial installation of the software on the high-level controller.

Figure 6:
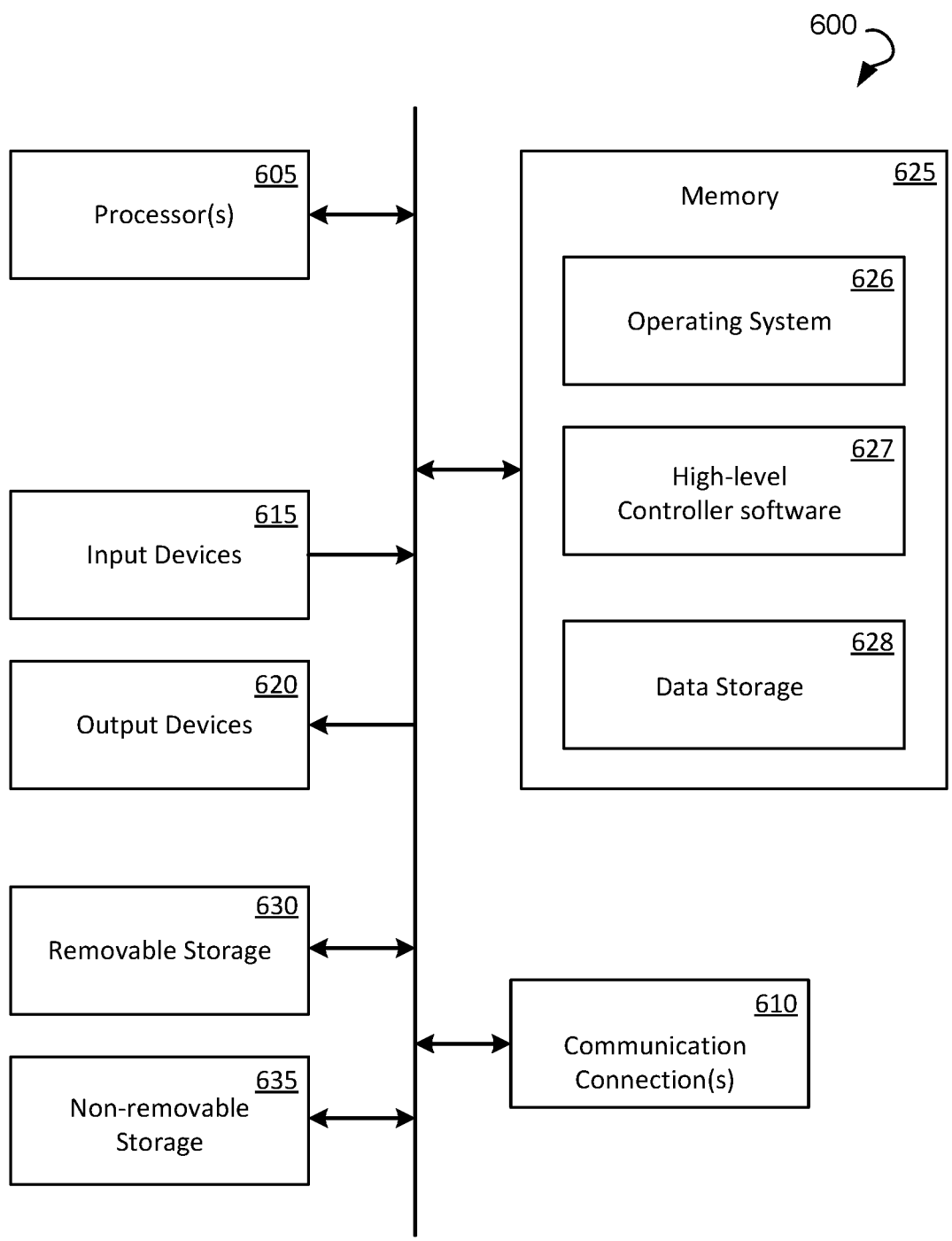
FIG. 6 illustrates components that can be included in a computer configured to operate as a high-level controller, according to certain example embodiments of the disclosure.

FIG. 6 illustrates example components that can be included in a computer 600 configured to operate as the high-level controller 105 in accordance with an example embodiment of the disclosure. It should be understood that in various example embodiments, the high-level computer 105 may be configured as a server computer. Accordingly, some of the hardware elements described below with reference to FIG. 6 may be omitted and other elements that are typically used for operating a server computer may be used instead.

The high-level controller 105 may include a processor 605 capable of communicating with a memory 625. The processor 605 may be implemented as appropriate in hardware, software, firmware, or combinations thereof. Software or firmware implementations of the processor 605 may include computer-executable or machine-executable instructions written in any suitable programming language to perform the various functions described. In one embodiment, instructions associated with a function block language may be stored in the memory 625 and executed by the processor 605.

A memory 625 may store program instructions that are loadable and executable on the processor 605, as well as data generated during the execution of these programs. Depending on the configuration and type of the high-level controller 105, the memory 625 may be volatile (such as random-access memory (RAM)) and/or non-volatile (such as read-only memory (ROM), flash memory, etc.). In some embodiments, the high-level controller 105 may also include additional removable storage 630 and/or non-removable storage 635 including, but not limited to, magnetic storage, optical disks, and/or tape storage. The memory 625 and associated computer-readable media may provide non-volatile storage of computer-readable instructions, data structures, program modules, and other data for the devices. In some implementations, the memory 625 may include multiple different types of memory, such as static random-access memory (SRAM), dynamic random-access memory (DRAM), or ROM.

The memory 625, removable storage 630, and non-removable storage 635 are all examples of non-transitory computer-readable storage media. Non-transitory computer-readable storage media may include volatile and non-volatile, removable and non-removable media implemented in any method or technology for storage of information such as computer-readable instructions, data structures, program modules or other data. Additional types of non-transitory computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of non-transitory computer-readable media.

The high-level controller 105 may also include one or more communication connections 610 that may allow the high-level controller 105 to communicate with devices or equipment capable of communicating with the high-level controller 105. The connections can be established via various data communication channels or ports, such as USB or COM ports to receive connections for cables connecting a control device to various other devices on a network, such as the communications network 110. In one embodiment, the high-level controller 105 may include Ethernet drivers that enable the high-level controller 105 to communicate with other devices. According to various embodiments, the communication connections 610 may be established via one or more wired and/or wireless connection.

The high-level controller 105 may also include one or more input devices 615, such as a keyboard, mouse, pen, voice input device, and touch input device. The high-level controller 105 may further include one or more output devices 620, such as a display, printer, and speakers.

Turning to the contents of the memory 625, the memory 625 may include, but is not limited to, an operating system (OS) 626 (such as may be used in a server computer) and one or more application programs or services for implementing the features and aspects disclosed herein with reference to the high-level controller 105. Such applications or services may include high-level controller software 627 and data storage 628.

Figure 7:
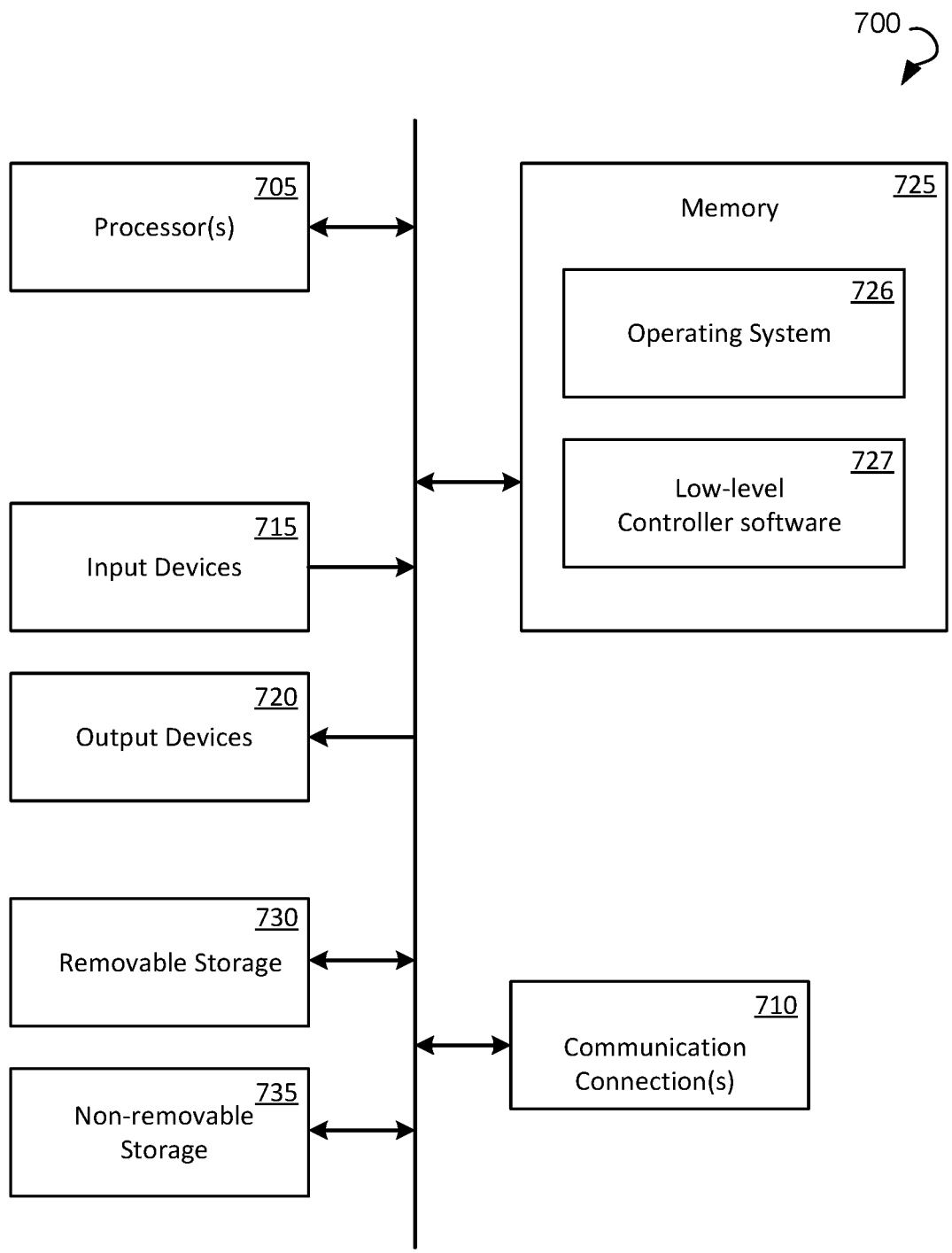
FIG. 7 illustrates components that can be included in a computer configured to operate as a low-level controller, according to certain example embodiments of the disclosure.

FIG. 7 illustrates some example elements that can be included in a computer 700 configured to operate as the low-level controller 115 in accordance with an example embodiment of the disclosure. The processor 705, input devices 715, output devices 720, removable storage 730, and non-removable storage 735, and communication connection(s) 710 that are shown in FIG. 7 are identical or substantially similar to corresponding elements shown in FIG. 6 and described above. Consequently, these elements will not be described here. However, attention is drawn to the memory 725 that may be a part of the computer configured to operate as the low-level controller 115. The memory 725 may include, but is not limited to, an operating system (OS) 726 (such as may be used in a client computer)

and one or more application programs or services for implementing the features and aspects disclosed herein with reference to the low-level controller 115. Such applications or services may include low-level controller software 727. The low-level controller software 727 may be executed by the processor 705.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   a high-level controller;
   a low-level controller in communication with the high-level controller via a network through a network connection, the low-level controller being configured to:
   receive high-level control references from the high-level controller via the network connection;
   generate low-level control references for a hardware asset based at least in part on the high-level control references;
   facilitate control of the hardware asset in response to an error in the network connection; and
   receive a series of heartbeat signals, wherein the error in the network connection is based at least in part on receipt of the series of heartbeat signals;
   a prioritization module, the prioritization module being configured to:
   prioritize one or more communications between the high-level controller and the low-level controller based at least in part on relative priorities of the one or more communications; and
   allocate a network bandwidth among the one or more communications based on the prioritization of the one or more communications;
   a counter communicated between the high-level controller and the low-level controller, the counter representing a number in the series of heartbeat signals; and
   a health monitoring module configured to:
   monitor the network connection;
   detect the error in the network connection;
   in response to the detection of the error in the network connection, transfer a control of the hardware asset to the low-level controller;
   determine time between the series of heartbeat signals;
   determine that the network connection has been restored; and
   in response to the determination that the network connection has been restored, transfer the control of the hardware asset to the high-level controller.

2. The system of claim 1, further comprising an installation module configured to:
   interrupt communications in the network connection to temporarily transfer the control of the hardware asset to the low-level controller;
   install software on the high-level controller while the low-level controller is in control of the hardware asset; and
   restore the network connection, thereby causing a transfer of the control of the hardware asset back to the high-level controller.

3. The system of claim 1, wherein the health monitoring module is configured to monitor the network connection by periodically sending at least one signal between the high-level controller and the low-level controller, wherein a lack of acknowledgment of receipt of the at least one signal is indicative of the error in the network connection.

4. The system of claim 1, wherein the low-level controller is configured to operate in a fail-safe self-contained loop mode during a loss of communications.

5. The system of claim 1, wherein the hardware asset includes a power generating asset.

6. The system of claim 1, wherein the low-level controller is configured to control the hardware asset by providing the low-level control references to sensors and actuators associated with the hardware asset.

7. The system of claim 1, wherein the prioritization module is further configured to:
   prioritize one or more applications associated with the high-level controller and the low-level controller based on respective relative priorities of the one or more applications; and
   allocate a central processing unit (CPU) clock time among the one or more applications based on the prioritization of the one or more applications.

8. The system of claim 7, wherein the prioritization module is configured to allocate the CPU clock time for the one or more applications by defining a maximum execution duration for each allocated unit based on the relative priorities of the one or more applications.

9. The system of claim 1, wherein the prioritization module is configured to allocate the network bandwidth for the one or more communications by defining a maximum bandwidth segment for each allocated unit based on the relative priorities of the one or more communications.

10. The system of claim 1, wherein the health monitoring module is configured to transfer the control of the hardware asset by switching the control between the low-level controller and the high-level controller.

11. A method comprising:
    receiving, via a network connection, by a low-level controller from a high-level controller, high-level control references;
    generating, by the low-level controller, low-level control references for a hardware asset based at least in part on the high-level control references;
    receiving, by the low-level controller, a series of heartbeat signals;
    monitoring, by a health monitoring module, the network connection;
    prioritizing one or more communications between the high-level controller and the low-level controller based at least in part on relative priorities of the one or more communications; and
    allocating a network bandwidth among the one or more communications based on the prioritization of the one or more communications;
    communicating a counter between the high-level controller and the low-level controller, the counter representing a number in a series of heartbeat signals;

detecting, by the health monitoring module, an error in the network connection, wherein the error in the network connection is based at least in part on receipt of the series of heartbeat signals;

in response to the detection of the error in the network connection, transferring, by the health monitoring module, a control of the hardware asset to the low-level controller;

determining, by the health monitoring module, that the network connection has been restored; and in response to the determination that the network connection has been restored, transferring, by the health monitoring module, the control of the hardware asset to the high-level controller.

12. The method of claim 11, wherein the monitoring the network connection includes periodically sending, by the health monitoring module, at least one signal between the high-level controller and the low-level controller, wherein a lack of acknowledgment of receipt of the at least one signal is indicative of the error in the network connection.

13. The method of claim 11, further comprising:
forcing, by an installation module, the error in the network connection to temporarily transfer the control of the hardware asset to the low-level controller;
installing, by the installation module, software on the high-level controller while the low-level controller is in control of the hardware asset; and
restoring, by an installation module, the network connection, thereby causing a transfer of the control of the hardware asset back to the high-level controller.

14. The method of claim 11, further comprising:
prioritizing, by the prioritization module, one or more applications associated with the high-level controller and the low-level controller based on relative priorities of the one or more applications; and
allocating, by the prioritization module, a central processing unit (CPU) clock time among the one or more applications based on the prioritization of the one or more applications.

15. The method of claim 14, wherein the prioritizing of the one or more applications includes allocating, by the prioritization module, the CPU clock time for the one or more applications by defining a maximum execution duration for each allocated unit based on the relative priorities of the one or more applications.

16. The method of claim 11, wherein the prioritizing of the one or more communications includes allocating, by the prioritization module, the network bandwidth for the one or more communications by defining a maximum bandwidth segment for each allocated unit based on the relative priorities of the one or more communications.

17. The method of claim 11, wherein the transferring control of the hardware asset includes gradually shifting, by an installation module, the control between the low-level controller and the high-level controller.

18. A system comprising:
a high-level controller;
a low-level controller in communication with the high-level controller via a network through a network connection, the low-level controller being configured to:
receive high-level control references from the high-level controller via the network connection;
generate low-level control references for a hardware asset based at least in part on the high-level control references; facilitate control of the hardware asset in response to an error in the network connection;
communicating a counter between the high-level controller and the low-level controller, the counter representing a number in a series of heartbeat signals; and
receive the series of heartbeat signals, wherein the error in the network connection based at least in part on receipt of the series of heartbeat signals;
a prioritization module configured to:
prioritize one or more applications associated with the high-level controller and the low-level controller based on relative priorities of the one or more applications;
prioritize one or more communications between associated with the high-level controller and the low-level controller based on relative priorities of the one or more communications;
allocate a central processing unit (CPU) clock time among the one or more applications based on the prioritization of the one or more applications; and
allocate a network bandwidth among the one or more communications based on the prioritization of the one or more communications; and
a health monitoring module configured to:
monitor the network connection, the monitoring including periodically sending at least one heartbeat signal between the high-level controller and the low-level controller, wherein a lack of acknowledgment of receipt of the at least one heartbeat signal is indicative of the error in the network connection;
detect the error in the network connection;
in response to the detection of the error in the network connection, transfer control of the hardware asset to the low-level controller while the hardware asset is operating;
detect a restoration of the network connection; and
in response to the restoration of the network connection, transfer the control of the hardware asset back to the high-level controller; and
an installation module configured to:
interrupt communications in the network connection;
install software on the high-level controller while the low-level controller is controlling the hardware asset; and
facilitate access of the high-level controller to the network, thereby restoring the network connection between the high-level controller and the low-level controller.

* * * * *